United States Patent [19]

Howard

[11] Patent Number: 4,613,408
[45] Date of Patent: Sep. 23, 1986

[54] FUEL PRODUCING APPARATUS USING WASTE PRODUCTS

[76] Inventor: William A. Howard, P.O. Box 400, Estacada, Oreg. 97023

[21] Appl. No.: 674,305

[22] Filed: Nov. 23, 1984

[51] Int. Cl.$^4$ .............................................. C10B 1/00
[52] U.S. Cl. ...................................... 202/84; 48/111; 165/96; 202/105; 202/120
[58] Field of Search ................ 201/2.5, 15, 25, 30; 202/84, 105, 109, 120; 48/111; 165/32 HV, 96 HV

[56] References Cited

U.S. PATENT DOCUMENTS

| 1,864,720 | 6/1932 | Fields | 208/126 |
| 3,962,044 | 6/1976 | Mackenzie | 201/2.5 |
| 3,997,407 | 12/1976 | Fujii et al. | 202/221 |
| 4,030,984 | 6/1977 | Chambers | 201/25 |
| 4,203,804 | 5/1980 | Janning et al. | 202/121 |
| 4,235,676 | 11/1980 | Chambers | 202/118 |

FOREIGN PATENT DOCUMENTS

| 51-3506 | 2/1976 | Japan | 201/2.5 |
| 53-25874 | 7/1978 | Japan | 201/2.5 |

Primary Examiner—Donald Czaja
Assistant Examiner—Jennifer E. Cabaniss
Attorney, Agent, or Firm—Eugene M. Eckelman

[57] ABSTRACT

Apparatus producing fuel from waste products of the type capable of forming a flammable oil and gas when heated. The apparatus and method are particularly useful for disposing of discarded vehicle tires and at the same time producing fuel capable of operating engines or burners. The system utilizes a cooking pot and cooling apparatus for condensing gas formed in the cooking vessel to produce a flammable oil. The system including the cooking vessel is closed except for outlets from the cooling apparatus for both the oil and gas, whereby no appreciable pollution is discharged to atmosphere.

5 Claims, 2 Drawing Figures ature and time. Such may require temperatures of 500° F. to 1500° F. for 10 minutes to 30 minutes.

FUEL PRODUCING APPARATUS USING WASTE PRODUCTS

BACKGROUND OF THE INVENTION

This invention relates to new and useful improvements in an apparatus arranged to dispose of waste products and at the same time use such waste products as a source of flammable oil and gas.

Various types of waste products when cooked release a flammable gas and/or oil which can be used as the energy source for motors, burners, etc. An example of a waste product that has had no large scale and successful recycling process comprises discarded vehicle tires. Even though such tires have completed their usefulness they still have an abundance of energy producing material in the carcass thereof. Steps have been taken to recycle them but as stated above they have not been recycled successfully, possibly in view of the pollution emitted when burning them, the difficulty in reducing them to a useful product by grinding or the like because of metal and fabric therein, and other reasons.

SUMMARY OF THE INVENTION

According to the present invention and forming a primary objective thereof, apparatus and method are provided for cooking waste products and retrieving flammable gases and oils, such apparatus and method comprising an efficient system for extracting such gases and oils and also for disposing of waste products at minimum expense.

It is also an important object of the invention to provide an apparatus and method of the type described which utilizes a completely closed, non-combusting system, whereby there is little or no pollution emitted to the atmosphere.

In carrying out the objectives of the invention, a closed cooking vessel is provided which is arranged to receive waste products for melting by heating from an exterior burner. This vessel has an outlet conduit at the upper portion thereof for the discharge of gas produced in the cooking operation. The outlet communicates with condensing means, and means at the bottom of the condensing means are provided for collecting oil that may be condensed and means at the top of the condensing means are provided for tapping off gas. The condensing means comprises a closed float tank buoyantly supported in an open top cooling tank. The gas and oil outlets have valve means therein which seal them but which provide for controlled outlet. It is also within the concept of the invention to hook the gas or oil outlets of the float tank directly to drive means such as an engine or burner, or such gas or oil outlet can lead directly back to the burner for the burner of the invention.

The invention will be better understood and additional objects and advantages will become apparent from the following description taken in connection with the accompanying drawings.

DETAILED DESCRIPTION OF A PREFERRED EMBODIMENT

Figure 1:
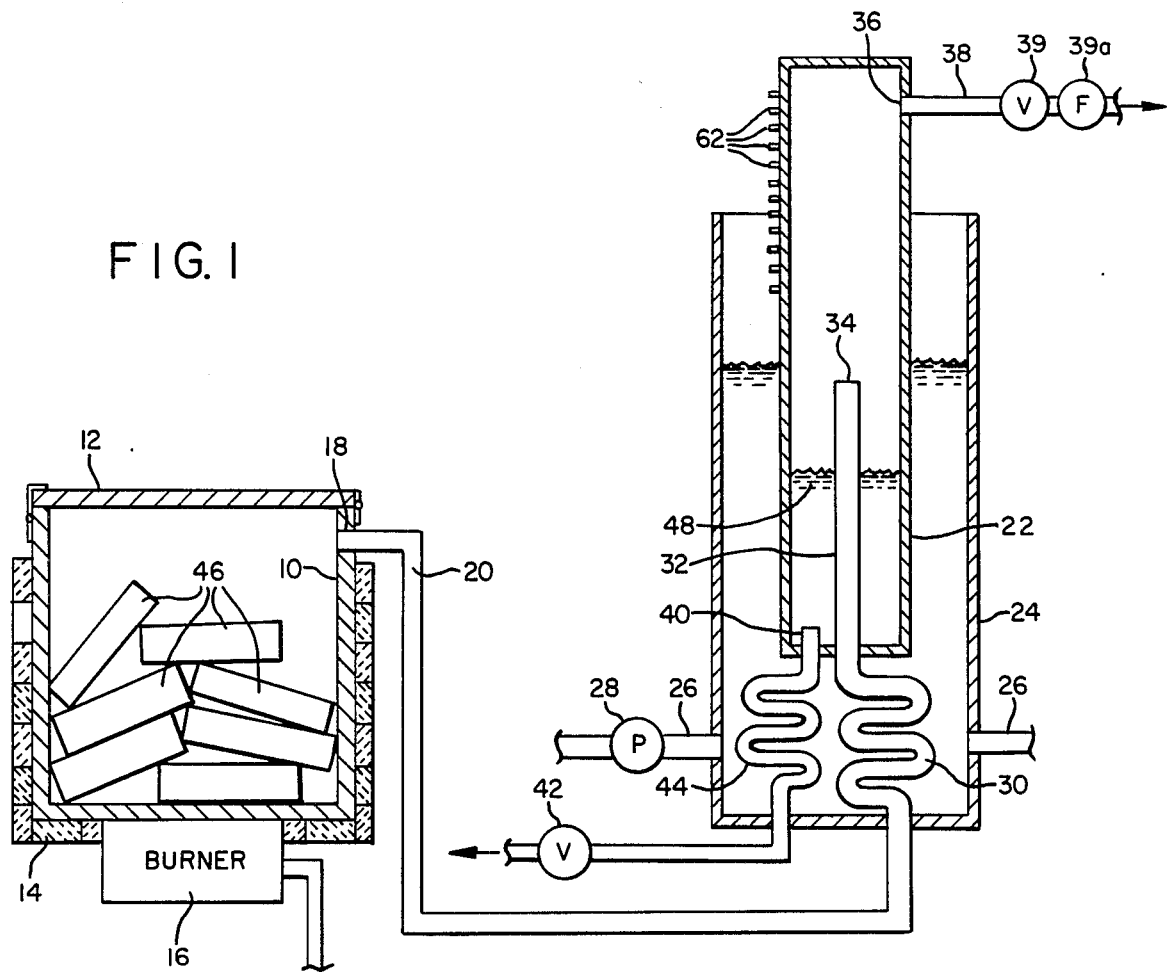
FIG. 1 is a sectional view, partially diagrammatic, showing details of construction of the present fuel producing apparatus and the system for carrying out the method.

With reference first to FIG. 1, the invention includes a melting pot or vessel 10 having a sealed but removable cover 12. The pot 10 preferably is enclosed or partially enclosed by insulating walls 14 and is removable from walls 14 for ease of cleaning. Pot 10 is associated with an exterior burner 16 of conventional construction, such as a gas or oil burner and is closed except for an upper discharge opening 18 communicating with a conduit 20 which leads to a float tank 22 buoyantly supported in a cooling or condensing tank 24. The condensing tank contains a supply of water or other cooling medium therein, and suitable and conventional circulating means 26 and pump 28 in such circulating means may be employed with this tank.

Conduit 20 has a flexible or expanding portion 30 which in addition to allowing the float tank 22 to move up and down in its buoyant support also serves as an expanded, condensing coil-like structure. Conduit 20 extends from the flexible portion 30 through the bottom of the float tank 22 in a sealed connection and upwardly into the tank in a stand pipe arrangement which may have an upper open top 34 disposed about halfway up the tank 22. Float tank 22 comprises a closed chamber except for an upper discharge opening 36 communicating with a conduit 38 having controlled flow by valve means 39 and forced outlet means 39a such as a fan.

A discharge conduit 40 leads from the bottom of tank 22 and has control valve means 42 therein. This conduit passes through a lower portion of the cooling tank 24 and has a flexible portion 44 which allows the float tank to move up and down in its buoyant support in the tank 24.

In the operation of the present apparatus, waste products 46, such as tires, are melted in the pot 10 at a suitable temperature and time. Such may require temperatures of 500° F. to 1500° F. for 10 minutes to 30 minutes. A cooking temperature of 1000° F. is considered to be an efficient cooking temperature. Pot 10 is closed and thus all of the products of combustion will discharge through conduit 20 and lead through the cooling tank 24 into the float tank 22. Since the tank 22 is cooled in its buoyant support in the tank 24, most of the gases will condense and be converted into a liquid 48. Such liquid can be drawn off through discharge conduit 40. Gas that has not condensed is drawn off through the upper discharge conduit 38 by operation of valve 39 and fan 39a.

According to the present invention, waste products can be consumed and at the same time flammable fuel means obtained therefrom. In the case of vehicle tires, a flammable gas and flammable oil are both retrieved. The system is entirely closed except for the outlet conduit 38 and the gas which is drawn off is suitable for combustion in motors or burners. Since the system is entirely closed, including the pot 10, there is no combustion. The concept is to melt the tires or other waste products at a high temperature and not burn them. This eliminates formation of smoke or ash. The pot 10 must be cleaned at suitable intervals to remove clinkers. The gases in conduit 38 can be piped directly to a motor or back to the burner 16 since such gases are combustible and can comprise a fuel source for an engine or for the burner 16.

Figure 2:
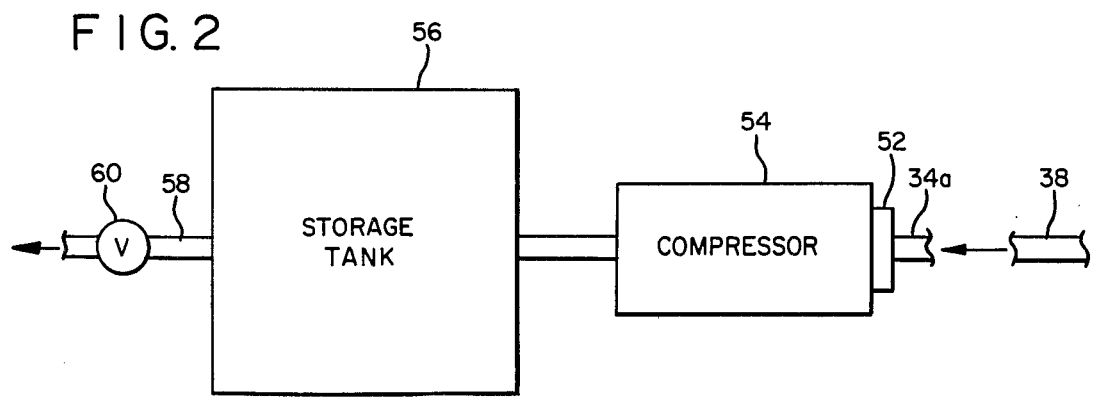
FIG. 2 is a diagrammatic view illustrating a source of use of fuel produced by the present apparatus.

FIG. 2 illustrates a concept wherein the outlet conduit 38 of FIG. 1 leads to a conduit 34a comprising the fuel inlet to the fuel mixing device 52 of an internal combustion engine which drives a compressor 54. In turn, the compressor is hooked to the usual storage tank 56 of compressed air having an outlet 58, with valve 60, for supply to desired usages. In this arrangement, the fan means 39a may not be necessary since the vacuum of fuel mixing device 52 will draw the gas from the float tank 22. Discharge conduit 40 may similarly lead to an engine or burner for directly supplying liquid fuel from the bottom of the float tank 22 to such engine or burner. Also, it makes for a low cost and efficient system to pipe the gas and/or oil directly back to the burner 16.

Float tank 22 has a plurality of graduations or markings 62 which indicate the vertical buoyant position of the tank 22 relative to in the tank 24. By observing the graduations 62, in alignment with the top of tank 24, the amount of condensed liquid 48 in the tank 22 can be determined. Liquid 48 can thus be drawn off by observing the displacement of the tank 22 in the tank 24.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Apparatus for producing fuel from waste products of the type capable of releasing a flammable oil and gas when heated comprising a melting pot arranged to receive water products, exterior heating means for said pot arranged to melt the waste products, an outlet at an upper portion of said pot for the discharge of gas resulting from melting the waste products, a closed float tank communicating with said outlet, cooling means comprising an open top cooling tank having cooling liquid therein for buoyantly supporting said float tank and for condensing said gas, and discharge means in said float tank arranged to tap off gases and condensed oil, said melting pot and cooling tank being sealed to atmosphere to prevent escape of polluting by-products.

2. The apparatus of claim 1 wherein said cooling means comprises heat exchange coils in said cooling tank.

3. The apparatus of claim 1 wherein said cooling means comprises heat exchange coils in said cooling tank, said heat exchange coils being expandable to allow said closed tank to adjust vertically in its buoyant support in said cooling tank.

4. The apparatus of claim 1 wherein said cooling tank includes circulating means for cooling liquid therein.

5. The apparatus of claim 1 wherein said discharge means is disposed at a lower portion of said float tank, and indicating means associated with said float tank designating the displacement of liquid in said cooling tank.

* * * * *